United States Patent
Voelker et al.

(10) Patent No.: US 12,481,888 B2
(45) Date of Patent: Nov. 25, 2025

(54) METHODS AND SYSTEMS FOR SIMULATING DYNAMICAL SYSTEMS VIA SYNAPTIC DESCENT IN ARTIFICIAL NEURAL NETWORKS

(71) Applicant: Applied Brain Research Inc., Waterloo (CA)

(72) Inventors: Aaron Russell Voelker, Stittsville (CA); Christopher David Eliasmith, Waterloo (CA)

(73) Assignee: APPLIED BRAIN RESEARCH INC., Waterloo (CA)

( * ) Notice: Subject to any disclaimer, the term of this patent is extended or adjusted under 35 U.S.C. 154(b) by 1019 days.

(21) Appl. No.: 17/475,174

(22) Filed: Sep. 14, 2021

(65) Prior Publication Data
US 2022/0083867 A1    Mar. 17, 2022

Related U.S. Application Data (60) Provisional application No. 63/078,200, filed on Sep. 14, 2020.

(51) Int. Cl.
*G06N 3/082* (2023.01)
*G06N 3/048* (2023.01)

(52) U.S. Cl.
CPC ............. *G06N 3/082* (2013.01); *G06N 3/048* (2023.01)

(58) Field of Classification Search
CPC ................................ G06N 3/082; G06N 3/048
See application file for complete search history.

(56) References Cited

U.S. PATENT DOCUMENTS

2017/0076020 A1    3/2017   Hoeink
2018/0053090 A1    2/2018   Voelker et al.

OTHER PUBLICATIONS

Cadini, "Simulating the dynamics of the neutron flux in a nuclear reactor by locally recurrent neural networks" (Year: 2017).*
Dongsung Huh, "Gradient Descent for Spiking Neural Networks" (Year: 2017).*

(Continued)

*Primary Examiner* — Van C Mang
(74) *Attorney, Agent, or Firm* — Jenna L. Wilson; Wilson Lue LLP (firm)

(57) ABSTRACT

The present invention relates to methods and systems for using neural networks to simulate dynamical systems for purposes of solving optimization problems. More specifically, the present invention defines methods and systems that perform a process of "synaptic descent" for performing "synaptic descent", wherein the state of a given synapse in a neural network is a variable being optimized, the input to the synapse is a gradient defined with respect to this state, and the synapse implements the computations of an optimizer that performs gradient descent over time. Synapse models regulate the dynamics of a given neural network by governing how the output of one neuron is passed as input to another, and since the process of synaptic descent performs gradient descent with respect to state variables defining these dynamics, it can be harnessed to evolve the neural network towards a state or sequence of states that encodes the solution to an optimization problem.

9 Claims, 3 Drawing Sheets

(56) References Cited

OTHER PUBLICATIONS

Woods, "EEE Transactions on Nanotechnology, vol. 14, No. 6, Nov. 2015 945 Synaptic Weight States in a Locally Competitive Algorithm for Neuromorphic Memristive Hardware" (Year: 2015).*

Akira Hirose, "Nature of complex No. and complex-valued neural networks" (Year: 2010).*

Cadini et al: "Simulating the dynamics of the neutron flux in a nuclear reactor by locally recurrent neural networks", Annals of Nuclear Energy, Pergamon Press, Oxford, GB, vol. 34, No. 6, May 16, 2007 (May 16, 2007), pp. 483-495, XP022081209, ISSN: 0306-4549, DOI: 10.1016/J.ANUCENE.2007.02.013.

* cited by examiner

METHODS AND SYSTEMS FOR SIMULATING DYNAMICAL SYSTEMS VIA SYNAPTIC DESCENT IN ARTIFICIAL NEURAL NETWORKS

FIELD OF THE INVENTION

The present invention generally relates to the field of simulating dynamical systems with artificial neural networks so as to solve optimization problems in which the solution to a given problem is found by evolving the dynamical system towards a solution state or through a solution trajectory.

BACKGROUND OF THE INVENTION

A common workload for modern computing systems involves implementing optimization algorithms that search over a collection of variable settings to find a maximally desirable configuration or sequence of configurations. In the domain of machine learning, optimization algorithms are frequently used to compute updates to model parameters so as to improve a numerical measure of model performance given by a loss function defined with respect to a collection of training data. In the context of neural network models specifically, the back-propagation algorithm is typically used to compute the gradient of a model's parameters with respect to a chosen loss function, and an optimization algorithm is used to update the model's parameters so as to move them intelligently in the direction of the gradient. Different optimization algorithms perform these updates in different ways by tracking the history of the gradient over multiple model training steps.

One interesting feature of the use of optimization algorithms for neural network models is that these algorithms are typically not implemented as part of a trained model. In other words, optimization is used to find good parameters during model training, but once a model is trained and deployed, the computations it performs typically solve a classification problem or a regression problem, not an optimization problem. Optimization algorithms are therefore somewhat "external" to the operation of many contemporary neural network models, and these models therefore have limited use when it comes to solving optimization problems via the computations performed by the flow of activity through a given neural network, which typically involves the output of one or more neurons being collected into a weighted sum and provided as the inputs to other neurons while optionally passing through a synapse model that spreads the effect of these inputs out over time.

More generally, all optimization algorithms can be characterized as dynamical systems with state spaces ranging over a collection of variables being optimized. Artificial neural networks can also be characterized as dynamical systems, and it therefore stands to reason that the dynamics implemented by a given neural network could potentially be harnessed to solve a given optimization problem. A number of different approaches to both performing optimization and implementing dynamical systems with neural networks are available in the prior art, and as such, the following documents and patents are provided for their supportive teachings and are all incorporated by reference: Prior art document https://arxiv.org/abs/1811.01430 discusses a range of methods that involve accelerating gradient-based optimization techniques and introduces mechanisms for lazy starting, resetting, and safeguarding in the context of these methods.

Another prior art document, https://pubmed.ncbi.nlm.nih.gov/4027280/ introduces methods for using a recurrently connected neural network to implement a dynamical system that, over time, settles into steady state that encodes the solution to an optimization problem. Importantly, the dynamics implemented by a neural network using these methods can be characterized fully by the network's connection weights, activation functions, and initial state; no input corresponding to a gradient is provided over the course of the network's processing.

A further prior art document, https://dl.acm.org/doi/10.1162/neco_a_01046 describes a variety of linear synapse models that modulate the dynamics implemented by a given neural network. These synapse models can be theoretically characterized so as to enable their use in neural networks while maintaining prescribed network dynamics up to a given order. Generally, synapse models act as filters on an input signal to a neuron created by the communication of activities from other neurons in a network, and it is common for these models to perform low-pass filtering via, for example, the application of an exponential decay function to a synaptic state variable. However, with non-linear synapse models, it quickly becomes intractable to understand, analyze, and exploit the computations performed by these models to perform network-level information processing.

The methods and systems described in the aforementioned references and many similar references do not specify how to design artificial neural networks in which the activities of the network compute gradients online, and in which these gradients are accumulated via the operations of an optimization algorithm into the state of the network over time. More specifically, the existing state-of-the-art provides little in the way of methods for harnessing synaptic computations within an artificial neural network to solve arbitrary optimization problems via the evolution of the network's state dynamics.

The present application addresses the above-mentioned concerns and shortcomings by defining methods and systems for simulating dynamical systems in neural networks that make use of nonlinear synapse models that internally implement an optimization algorithm to perform gradient descent over time. This process of "synaptic descent" provides a tool for harnessing nonlinear synapses in order to perform some desired dynamical computation at the network level. Synaptic descent efficiently implements a large class of algorithms that can be formulated as dynamical systems that minimize some loss function over time by following the gradient of the loss with respect to the state of the dynamical system. Examples of such algorithms include the locally competitive algorithm (LCA), expectation maximization, and many linear algebra algorithms such as matrix inversion, principal component analysis (PCA), and independent component analysis (ICA).

SUMMARY OF THE INVENTION

In the view of the foregoing limitations inherent in the known methods for using neural networks to simulate dynamical systems for purposes of solving optimization problems, the present invention provides methods and systems for embedding the computations of an optimization algorithm into a synapse model that is connected to one or more nodes of an artificial neural network. More specifically, the present invention introduces a method and system for performing "synaptic descent", wherein the state of a given synapse in a neural network is a variable being optimized, the input to the synapse is a gradient defined with respect to this state, and the synapse implements the computations of an optimizer that performs gradient descent over time. Synapse models regulate the dynamics of a given neural network by governing how the output of one neuron is passed as input to another, and since the process of synaptic descent performs gradient descent with the respect the state variables defining these dynamics, it can be harnessed to evolve the neural network towards a state or sequence of states that encodes the solution to an optimization problem. More generally, synaptic descent can be used to drive a network to produce arbitrary dynamics provided that the appropriate gradients for these dynamics are computed or provided as input. As such, the general purpose of the present invention, which will be described subsequently in greater detail, is to provide methods and systems for simulating dynamical systems in neural networks so as to optimize some objective function in an online manner.

The main aspect of the present invention is to define methods and systems for using one or more nonlinear synapse models to perform the computations of an optimization algorithm directly inside of an artificial neural network for the purposes of simulating at least one dynamical system. The evolution of this at least one dynamical system typically approaches a state or trajectory that encodes the optimum for some problem of interest. For an artificial neural network consisting of a plurality of nodes and a plurality of synapse models, the methods comprise defining for each of one or more synapse models: a state tensor x as output of the synapse model, such that the elements of x define the state of the dynamical system being simulated, and each element of x is an input to at least one node in the artificial neural network; a gradient tensor g as input to the synapse model, such that the elements of g define instantaneous rates of change to the state of the dynamical system being simulated, and each element of g is a weighted summation of the output of at least one node in the artificial neural network; and a gradient descent optimizer, wherein the optimizer uses the gradient tensor g to update the state tensor x representing the state of the dynamical system being simulated, according to the operations of the gradient descent optimizer. The methods further comprise operating the artificial neural network together with the gradient descent optimizer specified by each of the one or more synapse models on the given computing system to simulate at least one dynamical system over time.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the exemplary drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure, and are not meant to be limiting in any fashion.

As used herein, the terms "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the artificial neural networks described herein may be implemented in configurable hardware (i.e. FPGA) or custom hardware (i.e. ASIC), or a combination of both with at least one interface. The input signal is consumed by the digital circuits to perform the functions described herein and to generate the output signal. The output signal is provided to one or more adjacent or surrounding systems or devices in a known fashion.

As used herein the term 'node' in the context of an artificial neural network refers to a basic processing element that implements the functionality of a simulated 'neuron', which may be a spiking neuron, a continuous rate neuron, or an arbitrary non-linear component used to make up a distributed system.

The described systems can be implemented using adaptive or non-adaptive components. The system can be efficiently implemented on a wide variety of distributed systems that include a large number of non-linear components whose individual outputs can be combined together to implement certain aspects of the system as will be described more fully herein below.

Figure 1:
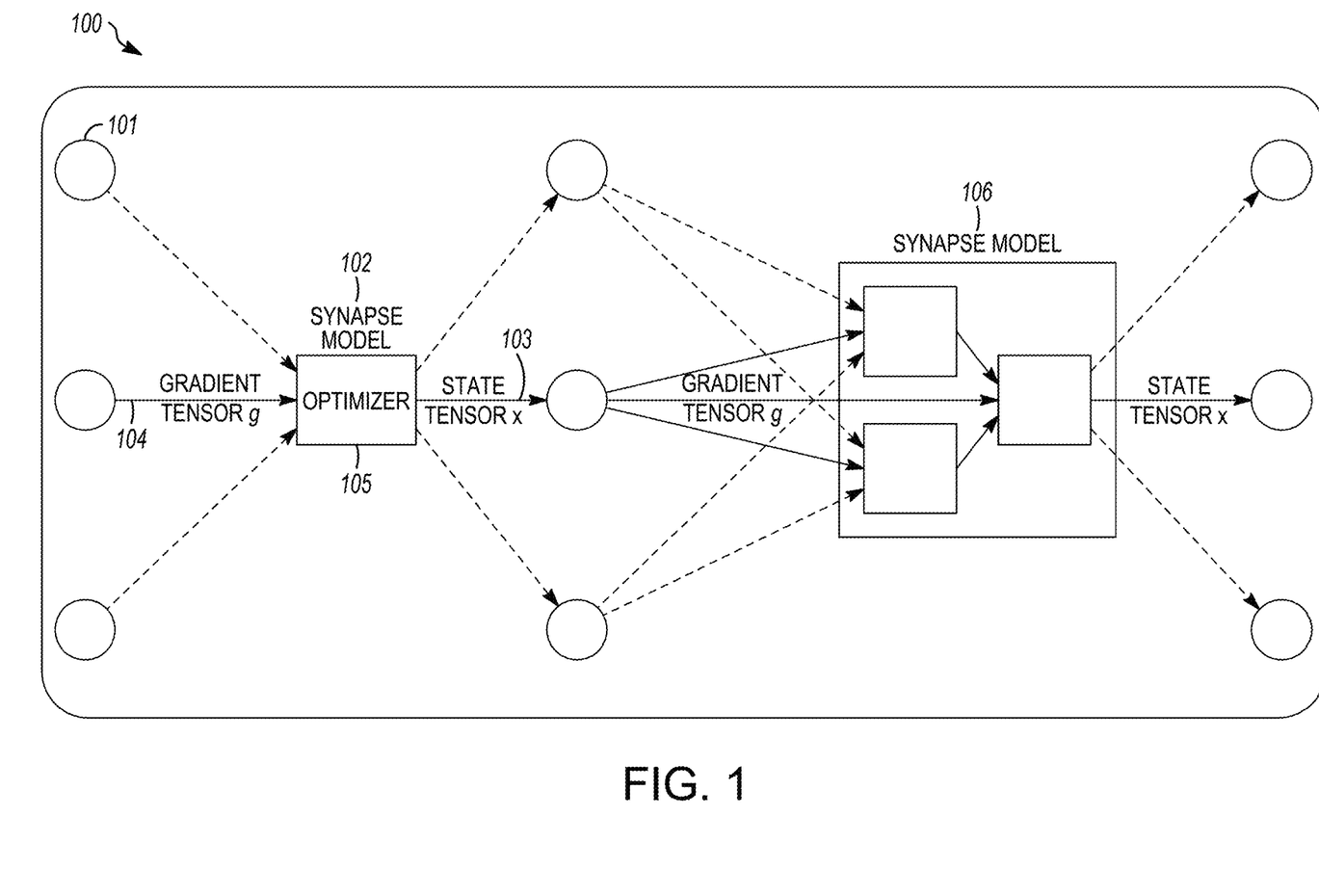
FIG. 1 is an illustration of the architectural design of an artificial neural network configured to perform synaptic descent.

The main embodiment of the present invention is a set of systems and methods for simulating dynamical systems in artificial neural networks via the use of nonlinear synapse models that compute the operations of a gradient descent optimizer as a neural network runs so as to minimize some loss function defining a desired set of network dynamics. This method of "synaptic descent" provides a tool for harnessing nonlinear synapses in order to perform some desired dynamical computation at the network level, and is demonstrated to efficiently implement a number of functions that are suitable for commercial applications of machine learning methods. Referring now to FIG. 1, for an artificial neural network [100] consisting of a plurality of nodes [101] and a plurality of synapse models [102], the methods comprise defining for each of one or more synapse models: a state tensor x [103] as output of the synapse model, such that the elements of x define the state of the dynamical system being simulated, and each element of x is an input to at least one node in the artificial neural network; a gradient tensor g [104] as input to the synapse model, such that the elements of g define instantaneous rates of change to the state of the dynamical system being simulated, and each element of g is a weighted summation of the output of at least one node in the artificial neural network; and a gradient descent optimizer [105], wherein the optimizer uses the gradient tensor g to update the state tensor x representing the state of the dynamical system being simulated, according to the operations of the gradient descent optimizer. The methods further comprise operating the artificial neural network together with the gradient descent optimizer specified by each of the one or more synapse models on the given computing system to simulate at least one dynamical system over time.

The term 'dynamical system' here refers to any system in which the system state can be characterized using a collection of numbers corresponding to a point in a geometrical space, and in which a function is defined that relates this system state to its own derivative with respect to time. In other words, a dynamical system comprises a state space along with a function that defines transitions between states over time. A large class of algorithms can be expressed as dynamical systems that evolve from an initial state that encodes a given algorithm's input to a resting state that encodes the algorithm's output. For example, all optimization algorithms define dynamical systems over a space of parameters that are being optimized. Examples of practically applicable algorithms that can be formulated as dynamical systems include the Locally Competitive Algorithm (LCA), Expectation Maximization (EM), and many linear algebra algorithms including matrix inversion, principal component analysis (PCA), and independent component analysis (ICA).

The term 'synapse model' here refers to a mathematical description of how the output values of one or more neurons in an artificial neural network are transformed into one or more input values for a given neuron in the network. A synapse model defines an internal state tensor along a set of computations that update this state tensor using an input tensor at each simulation timestep. A synapse model produces an output tensor at each timestep that feeds into at least one neuron model in an artificial neural network. Synapse models may be combined in a compositional manner [106] to define arbitrarily complex structures corresponding to the dendritic trees observed in biological neural networks. Examples of linear synapse models include low pass synapses, alpha synapses, double exponential synapses, bandpass synapses, and box-filter synapses. A core inventive step of this work is to use a gradient descent optimizer as a non-linear synapse to enable a neural network to perform gradient descent online in an efficient manner.

The term 'gradient descent optimizer' here refers broadly to any method or algorithm that applies a gradient to a state in order to minimize some arbitrary function of the state. Typically the gradient represents the gradient of said function with respect to changes in the state. Examples of such algorithms include Adadelta, Adagrad, Adam, Adamax, Follow the Regularized Leader (FTRL), Nadam, RMSprop, Stochastic Gradient Descent (SGD), as well as those incorporating variants of Nesterov acceleration with mechanisms for lazy starting, resetting, and safeguarding. In the context of this invention, we are concerned primarily with gradient descent optimization over time. That is, the state is time-varying, and the gradient represents how the state should change over time. This description corresponds to some dynamical system that is to be simulated over time, or equivalently, some set of differential equations that must be solved.

In the present invention, gradient descent optimization over the state of a dynamical system is performed via the computations of an artificial neural network. As a result, in a digital computing system, the dynamical system being simulated by a given neural network is discretized by some step size, which here corresponds to the 'time-step' of the neural network's internal computations. This time-step need not remain fixed during the operation of the neural network, and may depend on the input data provided to the neural network (e.g., for irregularly-spaced time-series data). A gradient descent optimizer may incorporate this time-step to account for the temporal discretization of an idealized continuous-time dynamical system on the given computing system. For example, the optimizer might scale the gradient by the time-step in order to make a first-order approximation of the dynamics—a method commonly referred to as Euler's method. More advanced optimizers may make increasingly higher-order approximations of the underlying continuous-time dynamics to solve the differential equations over the elapsed period of time (i.e., the current time-step of the neural network simulation).

The term 'loss function' here refers to a function that outputs some scalar 'loss' that is to be minimized by the computations of an artificial neural network. Examples of loss functions include mean-squared error (MSE), cross-entropy loss (categorical or binary), Kullback-Leibler divergence, cosine similarity, and hinge loss. The inputs to a loss function may consist of externally supplied data, outputs computed by nodes in an artificial neural network, supervisory and reward signals, the state of a dynamical system, or any combination thereof. In most cases the loss function does not need to be explicitly computed; only the gradient of the current loss with respect to changes in the current state needs to be computed.

The term 'tensor' here is used to refer to the generalization of a vector to arbitrary rank. For example, a scalar is a rank-zero tensor, a vector is a rank-one tensor, a matrix is a rank-two tensor, and so on. Each axis in the tensor can have any positive number of dimensions. Its list of dimensions, one per axis, is referred to as the 'shape' of the tensor. For example, a tensor with shape [2, 7, 5] can be used to represent the contents of two matrices each with 7×5 elements.

The term 'activation function' here refers to any method or algorithm for applying a linear or nonlinear transformation to some input value to produce an output value in an artificial neural network. Examples of activation functions include the identity, rectified linear, leaky rectified linear, thresholded rectified linear, parametric rectified linear, sigmoid, tan h, softmax, log softmax, max pool, polynomial, sine, gamma, soft sign, heaviside, swish, exponential linear, scaled exponential linear, and gaussian error linear functions. Activation functions may optionally include an internal state that is updated by the input in order to modify its own response, producing what are commonly referred to as 'adaptive neurons'.

Activation functions may optionally output 'spikes' (i.e., one-bit events), 'multi-valued spikes' (i.e., multi-bit events with fixed or floating bit-widths), continuous quantities (i.e., floating-point values with some level of precision determined by the given computing system—typically 16, 32, or 64-bits), or complex values (i.e., a pair of floating point numbers representing rectangular or polar coordinates). These aforementioned functions are commonly referred to, by those of ordinary skill in the art, as 'spiking', 'multi-bit spiking', 'non-spiking', and 'complex-valued' neurons, respectively. When using spiking neurons, real and complex values may also be represented by one of any number of encoding and decoding schemes involving the relative timing of spikes, the frequency of spiking, and the phase of spiking. However, it will be understood by those of ordinary skill in the art that the embodiments described herein may be practiced without these specific details.

The nonlinear components of the aforementioned systems can be implemented using a combination of adaptive and non-adaptive components. Examples of nonlinear components that can be used in various embodiments described herein include simulated/artificial neurons, FPGAs, GPUs, and other parallel computing systems. Components of the system may be implemented using a variety of standard techniques such as by using microcontrollers. In addition, non-linear components may be implemented in various forms including software simulations, hardware, or any neuronal fabric. Non-linear components may also be implemented using neuromorphic computing devices such as Neurogrid, SpiNNaker, Loihi, and TrueNorth.

As an illustrative embodiment of the proposed systems and methods, consider the computational problem of inverting a matrix using operations performed by an artificial neural network. It is not at all clear how to solve this problem using the techniques for implementing neural networks that are defined in the prior art. One way to approach the problem is to encode some initial guess for the matrix inverse in the state of the network (e.g., all zeros), and then iteratively update this state in the direction that minimizes error with respect to the true matrix inverse. More specifically, a matrix M can be inverted by solving for the state tensor X that minimizes the mean-squared error between MX and I, which has the following closed-form solution for computing the gradient: $g=2(MX-I)X^T$. Thus, using a gradient descent optimizer to update X according to the gradient tensor g will be guaranteed to converge to the globally optimal solution, $X \to M^{-1}$, since the optimization problem is convex.

If synaptic descent is applied in a neural network that computes this gradient tensor g at each timestep, the synapse model in the network will integrate this gradient tensor to produce the solution tensor $M^{-1}$ as the network state. Importantly, the choice of gradient descent optimizer used within the synapse models will affect the rate at which the network dynamics converge on the desired solution state. If the optimizer is a pure integrator (i.e., the synapse model implements gradient descent with a constant step size), then the network may converge on the solution state somewhat slowly. Alternatively, if the optimizer adaptively integrates by tracking the history of the gradient (e.g., the synapse model implements gradient descent with adaptive moment estimation), then the network may converge on the solution state much more rapidly.

To provide a demonstration of the use of synaptic descent for performing matrix inversions in a spiking neural network, https://github.com/nengro-labs/nengo-gyrus/blob/master/docs/examples/spiking_matrix_inversion.ipynb illustrates the inversion of a 5×5 matrix with <0.5% normalized root mean squared error (NRMSE) after generating on the order of a million spikes in a network simulated using the Nengo software library. The NRMSE decreases as a function of the total number of spikes being generated (e.g., ~10% NRMSE is achieved after roughly half as many spikes are generated). Thus, the method of synaptic descent allows for flexible tradeoff between latency, energy, and precision when using spike-based computing paradigms. In general, the ideal configuration for a neural network model performing synaptic descent will depend on the hardware being used to implement the model, the available energy budget, and the latency and accuracy requirements of the application being performed.

Figure 2:
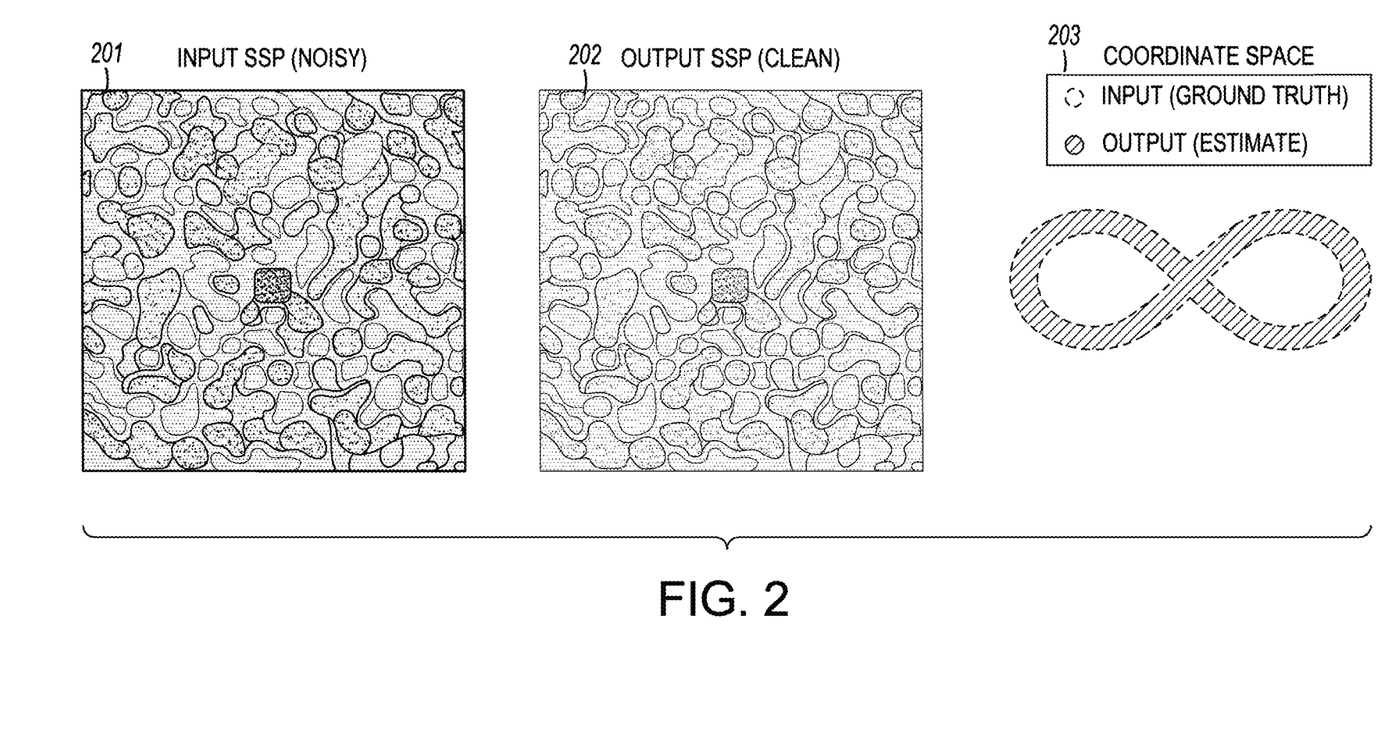
FIG. 2 is an illustration of the use of synaptic descent to simulate a dynamical system that encodes changing spatial positions in a two-dimensional plane to trace out a lemniscate over time.
Figure 3:
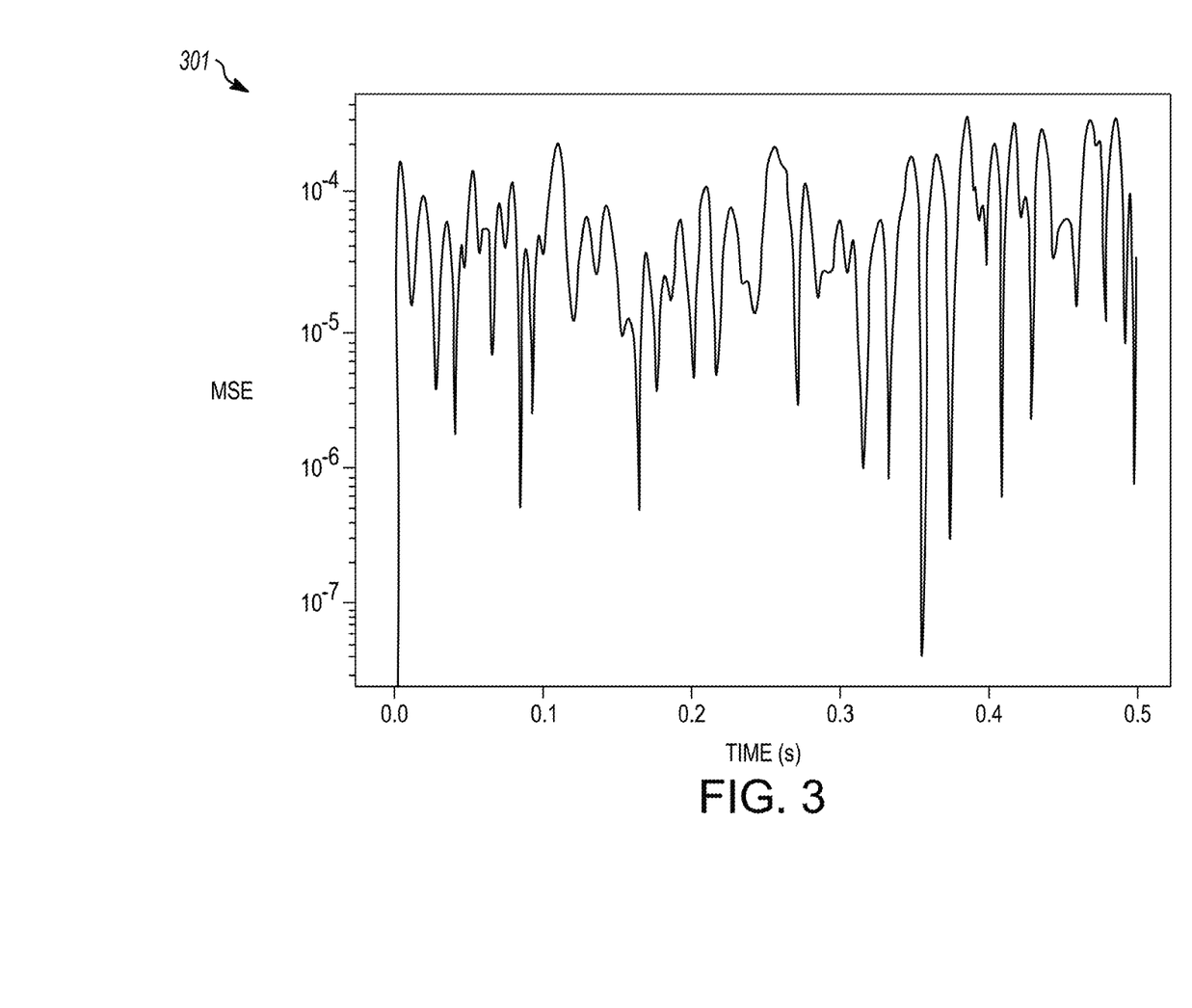
FIG. 3 is an illustration of the mean squared error between a ground truth dynamical system that encodes changing spatial positions in a two-dimensional plane, and a simulation of this dynamical system in a neural network via synaptic descent.

To provide a second demonstration of the use of synaptic descent, consider the commonly encountered problem of denoising or 'cleaning up' vector representations produced by lossy compression operations. Cleanup operations can be found in a variety of neural network architectures, including those that manipulate structured representations of spatial maps using representations called 'spatial semantic pointers' or SSPs (https://compneuro.uwaterloo.ca/files/publications/komer.2019.pdf). When cleaning up SSPs, the input to the cleanup operation is a noisy SSP corresponding to a pair of spatial coordinates, $SSP=f(x,y)=X^{\alpha x \alpha} \circledast Y^{\alpha y \alpha}$, where X and Y are vectors representing the axes of the spatial domain, x and y are coordinates within this domain, $\alpha^\alpha$ is a scaling factor, and $\circledast$ is the circular convolution operation. The desired output of the cleanup are the 'clean' coordinates being encoded, $\hat{x}$ and $\hat{y}$. It is possible to transform f(x,y) into $f(\hat{x},\hat{y})$ via synaptic descent by computing the gradient that minimizes the mean squared error between these two encodings and using a gradient descent optimizer to accumulate this gradient within the synapse model of a neural network. Let $z=f(x,y)$ and $\hat{z}=f(\hat{x},\hat{y})$, then:

$$\nabla L(\hat{x}, \hat{y}) = \frac{2\alpha}{d}\begin{pmatrix} z^T(\ln x)(z-\hat{z}) \\ z^T(\ln y)(z-\hat{z}) \end{pmatrix}$$

where $L(\hat{x},\hat{y})=\Sigma_{i=1}^{d}(z-\hat{z})^2/d$ is the mean squared error in the reconstructed SSP, ln x is the binding matrix for X, and ln Y is the binding matrix for Y. Here ln(.) denotes an application of the natural logarithm in the Fourier domain. These two binding matrices are fixed and real, and equal to what you get if you take the matrix logarithm of the binding matrix. The gradient is two-dimensional as there is one partial derivative for each coordinate being updated via gradient descent. This can be generalized to higher-dimensional SSPs; apply the binding for the logarithm of each axis vector to its respective coordinate in the same way. Referring to FIG. 2, decoding the spatial position [201] of a point encoded [202] into an SSP that moves along a two dimensional plane to trace out a lemniscate [203] using this technique indicates that synaptic descent is a highly effective method for simulating a desired dynamical system using a neural network. Referring to FIG. 3, the mean squared error of the true trajectory of this dynamical system with respect to the simulated trajectory is negligible [301].

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

The invention claimed is:

1. A computer implemented method for simulating dynamical systems in artificial neural networks for dynamic computing applications on a given computing system, the artificial neural network comprising a plurality of nodes, each node having an input and an output, and a plurality of synapse models, the method comprising:

providing for each of one or more synapse models
- a state tensor x as output of the synapse model, such that elements of x define a state of the dynamical system being simulated, and each element of x is an input to at least one node in the artificial neural network;
- a gradient tensor g as input to the synapse model, such that elements of g define instantaneous rates of change to the state of the dynamical system being simulated, and each element of g is a weighted summation of the output of at least one node in the artificial neural network; and
- a gradient descent optimizer, wherein the optimizer uses the gradient tensor g to update the state tensor x representing the state of the dynamical system being simulated, according to the operations of the gradient descent optimizer; and operating the artificial neural network together with the gradient descent optimizer specified by each of the one or more synapse models on the given computing system to simulate at least one dynamical system over time.

2. The method of claim 1, wherein the method further comprises
- specifying at least one loss function defining the desired dynamics of the dynamical system being simulated, and
- using one or more nodes in the artificial neural network to compute the gradient tensor g that matches the gradient of the at least one loss function with respect to changes to the corresponding state tensor x over time.

3. The method of claim 2, wherein the computations performed by one or more synapse models approximate the operations of each respective gradient descent optimizer.

4. The method of claim 2, wherein one or more nodes uses Euler's formula, cos (x)+i sin (x), for its activation function to output a complex number $e^{ix}$, given the input x.

5. The method of claim 2, wherein one or more gradient descent optimizers use the current time-step of the neural network simulation to compute the update to its respective state tensor.

6. The method of claim 2, wherein one or more synapse models are added and/or removed while the artificial neural network is operating.

7. A data processing system comprising:
- a non-transitory computer readable medium storing computer readable instructions and a data structure configured to simulate a desired dynamical system, wherein the data structure comprises a plurality of nodes, each node having a node input and a node output, the plurality of nodes being arranged into a plurality of layers of nodes including at least one input layer and at least one output layer, and a plurality of synapse models; and
- a computer processor operable to execute the computer readable instructions stored on the computer readable medium using the data structure to simulate the desired dynamical system, wherein the data structure is defined by:
  - a state tensor x as output of each synapse model, such that elements of x define the state of the dynamical system being simulated, and each element of x is an input to at least one node in the artificial neural network;
  - a gradient tensor g as input to each synapse model, such that elements of g define instantaneous rates of change to the state of the dynamical system being simulated, and each element of g is a weighted summation of the output of at least one node in the artificial neural network; and
  - a gradient descent optimizer for each synapse model, wherein the optimizer uses the gradient tensor g to update the state tensor x representing the state of the dynamical system being simulated, according to the operations of the gradient descent optimizer.

8. The data processing system of claim 7, wherein at least one loss function specifies the desired dynamics for the system to simulate, and a gradient tensor g computed by one or more nodes in the artificial neural network that matches the gradient of the at least one loss function, with respect to changes in its corresponding state tensor x over time.

9. The data processing system of claim 8, wherein the at least one dynamical system is defined by one of the following algorithms: a Locally Competitive Algorithm, an Expectation Maximization algorithm, and a linear algebra algorithm; and the gradient of the loss function being minimized by the algorithm with respect to the solution being produced by the algorithm is computed as the input to at least one synapse model.

* * * * *